US010757696B2

(12) United States Patent
Xiao et al.

(10) Patent No.: US 10,757,696 B2
(45) **Date of Patent: *Aug. 25, 2020**

(54) SYSTEM AND METHOD FOR TRANSMISSION AND RECEPTION OF CONTROL AND DATA CHANNELS WITH GROUP REFERENCE SIGNAL

(71) Applicant: Futurewei Technologies, Inc., Plano, TX (US)

(72) Inventors: Weimin Xiao, Hoffman Estates, IL (US); Qian Cheng, Naperville, IL (US); Philippe Sartori, Algonquin, IL (US); Vipul Desai, Palatine, IL (US); Jialing Liu, Palatine, IL (US); Lukasz Krzymien, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,693

(22) Filed: Nov. 13, 2018

(65) Prior Publication Data

US 2019/0082429 A1 Mar. 14, 2019

Related U.S. Application Data

(63) Continuation of application No. 14/975,256, filed on Dec. 18, 2015, now Pat. No. 10,187,880.

(51) Int. Cl.

| | |
|---|---|
| ***H04W 72/04*** | (2009.01) |
| ***H04B 7/06*** | (2006.01) |
| ***H04B 7/08*** | (2006.01) |
| ***H04W 72/08*** | (2009.01) |
| ***H04L 25/02*** | (2006.01) |

(Continued)

(52) U.S. Cl.

CPC ........ *H04W 72/042* (2013.01); *H04B 7/0408* (2013.01); *H04B 7/0413* (2013.01); *H04B 7/063* (2013.01); *H04B 7/0617* (2013.01); *H04B 7/0626* (2013.01); *H04B 7/0639* (2013.01); *H04B 7/0695* (2013.01); *H04B 7/088* (2013.01); *H04L 5/005* (2013.01); *H04L 5/0023* (2013.01); *H04L 5/0053* (2013.01); *H04L 5/0092* (2013.01); *H04L 25/0226* (2013.01);

(Continued)

(58) Field of Classification Search

CPC .................................................... H04B 7/0456

See application file for complete search history.

(56) References Cited

U.S. PATENT DOCUMENTS

| | | | |
|---|---|---|---|
| 2002/0136276 | A1 | 9/2002 | Franceschini et al. |
| 2010/0046463 | A1 | 2/2010 | Green |

(Continued)

FOREIGN PATENT DOCUMENTS

| | | | |
|---|---|---|---|
| CN | 102648652 | A | 8/2012 |
| CN | 104541540 | A | 4/2015 |

*Primary Examiner* — John D Blanton

(74) *Attorney, Agent, or Firm* — Slater Matsil, LLP

(57) ABSTRACT

A device and method for transmission and reception of control and data channels with a group reference signal (GRS). A GRS may include a first common reference signal associated with a first group of users and a second common reference signal associated with a second group of users. Some users or channels can be grouped to use one set of common reference signals and other users or channels can be grouped to use another set of common reference signals.

25 Claims, 6 Drawing Sheets

600

602 Receive, by a user equipment (UE), a first set of reference signals from a network controller 604 Transmit, by the UE, feedback information to the network controller of a first subset of the first set of reference signals selected by the UE 606 Receive, by the UE, a second set of reference signals from the network controller 608 Receive, by the UE, an indication of a linkage between the first subset of the first reference signals and the second set of reference signals from the network controller

(51) Int. Cl.
*H04L 5/00* (2006.01)
*H04B 7/0408* (2017.01)
*H04B 7/0413* (2017.01)

(52) U.S. Cl.
CPC ......... *H04W 72/046* (2013.01); *H04W 72/08* (2013.01); *H04L 5/0075* (2013.01)

(56) References Cited

U.S. PATENT DOCUMENTS

| | | | | |
|---|---|---|---|---|
| 2011/0110453 | A1 | 5/2011 | Prasad et al. | |
| 2011/0170468 | A1 | 7/2011 | Jain et al. | |
| 2012/0250642 | A1* | 10/2012 | Qu | H04W 48/12 370/329 |
| 2013/0039291 | A1 | 2/2013 | Blankenship et al. | |
| 2013/0252606 | A1 | 9/2013 | Nimbalker et al. | |
| 2013/0301454 | A1 | 11/2013 | Seol et al. | |
| 2014/0044044 | A1* | 2/2014 | Josiam | H04W 24/10 370/328 |
| 2014/0177745 | A1 | 6/2014 | Krishnamurthy et al. | |
| 2014/0254410 | A1 | 9/2014 | Seo et al. | |
| 2014/0307654 | A1 | 10/2014 | Kim | |
| 2014/0355707 | A1 | 12/2014 | Kim et al. | |
| 2015/0103934 | A1 | 4/2015 | Nam et al. | |
| 2015/0215761 | A1 | 7/2015 | Chen et al. | |
| 2015/0304996 | A1* | 10/2015 | Yang | H04L 5/0053 370/329 |
| 2016/0344464 | A1 | 11/2016 | Kim | |
| 2017/0070979 | A1 | 3/2017 | Mirzaee et al. | |
| 2017/0078001 | A1* | 3/2017 | Kim | H04B 7/0871 |
| 2017/0078004 | A1 | 3/2017 | Capar et al. | |
| 2017/0150424 | A1 | 5/2017 | Lee et al. | |

* cited by examiner

SYSTEM AND METHOD FOR TRANSMISSION AND RECEPTION OF CONTROL AND DATA CHANNELS WITH GROUP REFERENCE SIGNAL

CROSS-REFERENCE TO RELATED APPLICATIONS

This application is a continuation of U.S. application Ser. No. 14/975,256, filed on Dec. 18, 2015, which application is hereby incorporated herein by reference in its entirety.

TECHNICAL FIELD

The present disclosure relates to a device, network, and method for wireless communications, and, in particular embodiments, to a system and method for transmission and reception of control and data channels with group reference signals.

BACKGROUND

The amount of wireless data is growing at unprecedented pace in the last few years, pushing the capacity of current macro cellular deployments. Cellular communications systems, which utilize microwave spectrum bands (300 MHz to 3 GHz), are becoming capacity limited due to interference and traffic load. The use of high frequency bands, where vast amounts of bandwidth is available, is considered to be a crucial technology for future generation communication systems. The use of these frequency bands (e.g., 28, 38, 60 and 73 GHz) can mitigate the problem of capacity currently observed.

Propagation in the millimeter band (mmWave) is much more challenging than in the microwave band, resulting in a more stringent link budget at mmWave band than at microwave band. Transmitters and receivers equipped with a larger number of antenna arrays are a viable solution to compensate for the mmWave extra path loss by beamforming.

Because antenna size is inversely proportional to the carrier frequency, the use of these high frequency bands reduces the antenna size considerably. As such, a larger number of transmit and receive antenna arrays at both network and terminal sides may be employed.

Hybrid antenna architecture is likely to be used to trade off hardware complexity, power consumption, and the performance and coverage of the system. Hybrid antenna architecture typically includes analog (phase shifter) and digital (baseband pre-coder) beamforming parts.

SUMMARY

According to one embodiment, there is provided a method for wireless communications. The method comprises transmitting, by a network controller to a user equipment (UE), a first set of reference signals; receiving, by the network controller, feedback information from the UE of a first subset of the first set of reference signals selected by the UE; transmitting, by the network controller to the UE, a second set of reference signals; and indicating, by the network controller to the UE, a linkage between the first subset of the first set of reference signals and the second set of reference signals.

In another embodiment, there is provided a network controller in a wireless network for communicating with a user equipment (UE). The network controller comprises a processor; and memory coupled to the processor, the memory comprising instructions that, when executed by the processor, cause the network controller to: transmit a first set of reference signals to the UE and a second set of reference signals to the UE; receive feedback information from the UE of a first subset of the first set of reference signals selected by the UE; and indicate, to the UE, a linkage between the first subset of the first set of reference signals and the second set of reference signals.

In another embodiment, there is provided a method in a user equipment (UE) for communicating in a wireless network. The method comprises: receiving, by the UE, a first set of reference signals from a network controller; transmitting, by the UE, feedback information to the network controller of a first subset of the first set of reference signals selected by the UE; receiving, by the UE, a second set of reference signals from the network controller; and receiving, by the UE, an indication of a linkage between the first subset of the first set of reference signals and the second set of reference signals from the network controller.

In another embodiment, there is provided a user equipment (UE) for communicating in a wireless network. The UE comprises: a processor; and memory coupled to the processor, the memory comprising instructions that, when executed by the processor, cause the UE to: receive a first set of reference signals from a network controller; transmit feedback information to the network controller of a first subset of the first set of reference signals selected by the UE; receive a second set of reference signals from the network controller; and receive an indication of a linkage between the first subset of the first set of reference signals and the second set of reference signals from the network controller.

BRIEF DESCRIPTION OF THE DRAWINGS

For a more complete understanding of the present disclosure, and the advantages thereof, reference is now made to the following descriptions taken in conjunction with the accompanying drawing, wherein like numbers designate like objects, in which.

DETAILED DESCRIPTION OF ILLUSTRATIVE EMBODIMENTS

Figure 1:
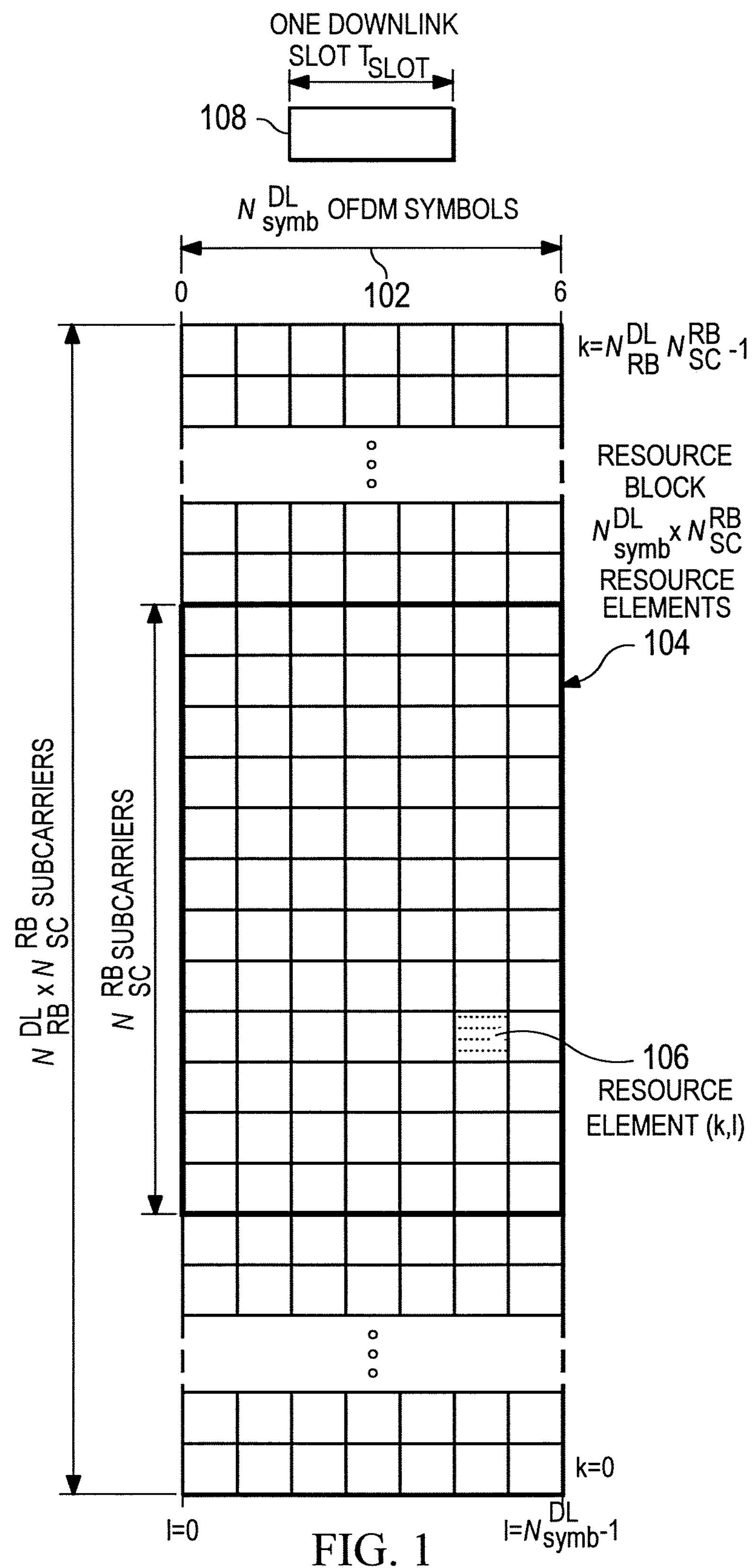
FIG. 1 illustrates example OFDM symbols with normal cyclic prefix (CP) in accordance with disclosed embodiments.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

With hybrid antenna architecture and the related precoding/beamforming design, the number of beams that can be formed at the same time (e.g., on an OFDM signal) may be limited by the number of digitized channels of the antenna. There is therefore a tradeoff of the coverage extension capability of the antenna and that of user multiplexing. Because of this tradeoff, there is an impact on the design of a reference signal and the transmission of the channels associated with the reference signal. A reference signal is a known signal transmitted on a set of time and frequency resource so that the receiver can perform channel estimation.

In a modern wireless communications system, such as a Third Generation Partnership Project (3GPP) Long Term Evolution (LTE) compliant communications system, a plurality of cells or evolved NodeBs (eNBs or eNodeBs) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or AP may be serving a number of users (also commonly referred to as User Equipment (UE), mobile stations, users, subscribers, terminals, and so forth) based on a priority metric, such as fairness, proportional fairness, round robin, and the like, over a period of time. It is noted that the terms cell, transmission points, and AP may be used interchangeably. Distinction between cells, transmission points, and APs will be made where needed.

In LTE compliant communications systems, the reference signal is associated with antenna ports. As will be appreciated by those of skill in the art, an antenna port is not the physical antenna itself. The channels (e.g., control, reference signals, data) are associated with one or more antenna ports, and the receiver sees the antenna ports through an associated reference signal. The reference signal conveys the channel information for data demodulation. It is assumed that the reference signal and the associated data channel are transmitted using the same antenna port, such that whatever precoding is done on the reference signal is also done on the associated data channel.

For example, in a downlink transmission in an LTE-A system, there is a reference signal for the UE to perform channel estimation for demodulation of the PDCCH and other common channels, as well as for measurement and some feedback. The reference signal is referred to as a common/cell-specific reference signal (CRS). In addition, UE-specific demodulation reference signals (DMRS) are transmitted in the physical downlink shared channel (PDSCH). In the downlink, DMRS is used for channel estimation during the PDSCH demodulation. An enhanced PDCCH (EPDCCH) is a downlink control channel having similar functionality as the PDCCH, but the EPDCCH demodulation is based on the DMRS as opposed to CRS-based demodulation for the PDCCH.

In orthogonal frequency-division multiplexing (OFDM) systems, OFDM sub-carriers are indexed in the frequency domain and OFDM symbols are indexed in the time domain, where the frequency bandwidth is divided into multiple sub-carriers in the frequency domain and where one sub-frame is divided into multiple OFDM symbols in the time domain. The OFDM symbol may have cyclic prefix to avoid the inter-symbol interference due to multiple path delays. One resource element (RE) is defined by the time-frequency resource within one sub-carrier and one OFDM symbol. A reference signal and other signals, such as a data channel, e.g., a physical downlink shared channel (PDSCH), and a control channel, e.g., a physical downlink control channel (PDCCH), are orthogonal and multiplexed in different resource elements in a time-frequency domain. Further, the signals are modulated and mapped into resource elements. By using an inverse Fourier transform per each OFDM symbol, signals in the frequency domain are transformed into signals in the time domain, and are transmitted with added cyclic prefix to avoid the inter-symbol interference.

FIG. 1 illustrates example OFDM symbols 102 with normal cyclic prefix (CP). Each resource block (RB) 104 contains a number of resource elements (REs) 106. In an embodiment, there are 14 OFDM symbols labeled from 0 to 13 in each sub-frame. For ease of illustration, only 7 OFDM symbols (e.g., symbols labeled 0 to 6) are shown. The symbols 0 to 6 in each sub-frame correspond to even slots, and the symbols 7 to 13 in each sub-frame correspond to odd slots. As illustrated, only one slot 108 of a sub-frame is shown. In the illustrated embodiment there are 12 sub-carriers labeled from 0 to 11 in each RB, and hence in this example, there are 168 REs in an RB. In each sub-frame, there are a number of RBs, and the number may depend on the bandwidth (BW).

Figure 2:
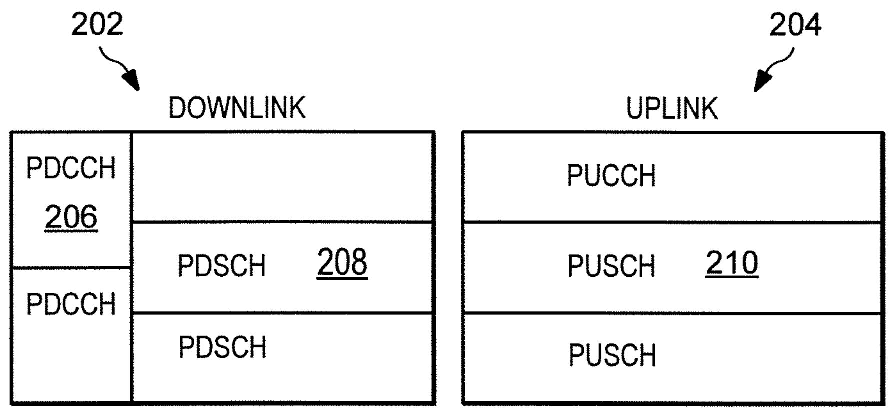
FIG. 2 illustrates example physical data and control channels in accordance with disclosed embodiments.

As illustrated in FIG. 2, the data channel transmitting data packets from an AP to one or more UEs in the physical layer is referred to as a physical downlink shared channel (PDSCH) 202, and the data channel transmitting data packets from one or more UEs to an AP in the physical layer is referred to as a physical uplink shared channel (PUSCH) 204. The corresponding physical control channels transmitted from the AP to the UEs indicate where the corresponding PDSCH and/or PUSCH is in the frequency domain and in which manner the PDSCH and/or PUSCH is transmitted. The corresponding physical control channel is referred to as a physical downlink control channel (PDCCH). As illustrated in FIG. 2, PDCCH 206 may indicate the signaling for PDSCH 208 or PUSCH 210.

UEs measure the channel status, especially for multiple antenna cases. In addition, other feedback information may be based on the measurement of a reference signal, such as a precoding matrix indicator (PMI), a channel quality indicator (CQI), and a rank indicator (RI) of the precoding matrix. There may be multiple reference signal resources configured for a UE. There is a specific time-frequency resource and scrambling code assigned by the AP for each reference signal resource.

Embodiments of this disclosure provide a device and method for transmission and reception of control and data channels with a group reference signal (GRS). A GRS can be a set of multiple CRSs. For example, a GRS may include a first common reference signal associated with a first group of users and a second common reference signal associated with a second group of users. In an embodiment, some users or channels can be grouped to use one set of CRSs and other users or channels can be grouped to use another set of CRSs. Previous systems used only one set of CRSs for all users. In contrast, the present disclosure includes multiple CRSs for different channels or groups of users.

In another example, a first GRS is a set of DMRS for multiple channels for a group of users. The group of users uses the set of DMRS for data and/or control channel reception.

In yet another example, a GRS is a set of reference signals in the context of hybrid beamforming. An embodiment device and method provides for signaling a set of downlink analog beamforming reference signals (BFRS) to a UE. An analog beamforming reference signal, as an example, is a downlink reference signal transmitted with precoding weights on associated antenna elements where the precoding weights can be applied in an analog domain and in a digital domain. The precoding weights and manner on which the precoding weights are applied on the antenna elements are generally transparent to the receiver. A BFRS resource may include time, frequency and sequence. A BFRS transmission may comprise the sequential transmission of analog transmit beams supported in the eNodeB. The cell signals the BFRS resource, its total number of analog beams and the analog beam grouping information to the UE. The UE should not derive the digital channel state information (CSI) feedback involving more than one analog beam from the same group.

An embodiment device and method signaling an analog beam restriction configuration to the UE is described. The restriction configuration may indicate a set of analog beams upon which the UE should not derive the digital CSI feedback including any of the analog beams indicated in the restriction configuration. The UE should not derive the digital CSI feedback involving more than one analog beam from the same group.

In an embodiment, the signaling of analog beam restriction configuration may be in the form of macro cell broadcasting, macro sending UE specific radio resource control (RRC) signaling, small cell broadcasting, small cells sending UE specific radio resource control (RRC) signaling, or any combination of the above.

In an embodiment, a UE receives the configuration of BFRS transmission of a set of network controllers and a set of analog beam restriction configuration. The UE receives each transmit analog beam after applying each of its receive beams. The receive beams of the UE, as an example, are realized through a phase shifter array. The UE collects the channel response for each of the transmit-receive-beam pairs. The UE performs sorting and pruning on the transmit-receive-beam pairs according to some metric, such as reference signal receive power (RSRP) or signal to interference plus noise ratio (SINR).

In an embodiment, a UE selects the best transmit-receive-beam pairs to form the effective MIMO channels and antenna ports for digital beamforming and MIMO transmissions. Multiple effective MIMO channels can be formed by including one transmit beam from one or more transmit beam groups, or one or more receive beams. For example, a system with 4 sets of transmit beams (one set of transmit beams includes the RF chain, phase shift and antenna array) at the eNodeB side and 2 sets of receive beams (one set of receive beams includes RF chain, phase shift and antenna array) at the UE side, could form 4×2, 3×2, 2×2, 1×2, 4×1, 3×1, 2×1 and 1×1 various effective MIMO channels.

The selection to form effective MIMO channels should follow the received analog beam restriction configuration. The effective MIMO channel should not include any transmit analog beams indicated in the restriction configuration. The effective MIMO channel should not include more than one transmit analog beam belonging to the same group.

In an embodiment, the UE derives the CSI feedback based on the effective MIMO channels and selects the best set(s) to feedback to the network. The feedback set should include the indexes of the analog transmit beams forming the selected effective MIMO channel and its corresponding rank, CQI, PMI or the pre-coding matrix. More than one set of feedback may be reported to the network, covering different rank or different effective MIMO choices of the same rank, according to network feedback configurations. The eNodeB may transmit downlink channels based on one of these sets of feedback. The downlink transmission of the channels comprises transmitting a set of reference signals based on the analog transmit beams corresponding to the set of feedback. The UE receives the set of reference signals and the associated data and/or control channels using the receive beams from the selected transmit-receive-beam pair. In the case that multiple sets of feedback are reported to the network, the UE needs to be informed as to which one set of the multiple sets feedback is based on to form antenna ports for reference signal transmission so that proper receive beams can be applied at the UE side.

The UE may be informed semi-statically, for example through RRC signaling. This is the case where reference signals are transmitted on the antenna ports formed based on one of the sets of feedback. These reference signals may be transmitted periodically for the UE to measure and report channel information. When the reference signals are configured for the UE to receive, the UE need also be informed as to which one set of the multiple sets feedback is based on to form antenna ports for reference signal transmission so that proper receive beams can be applied at the UE side. This is also the case where a layer 1 control channel is transmitted together with the reference signals on the antenna ports formed based on one of the sets of feedback.

In another example, the UE may be informed through a layer 1 control channel, for example, DCI (downlink control information). This is the case where data transmission is scheduled through a layer 1 control channel, e.g., DCI. The rank and/or precoding information of the data transmission are indicated through the layer 1 control channel. Depending on the rank and/or precoding used for data transmission, antenna ports for reference signal and the data transmission may be based on different sets of feedback which the receive UE needs to be aware of. The information is conveyed either through an additional field in the layer 1 control channel or derived through the fields in the layer 1 control channel, such as indication for rank and/or precoding and/or transmission antenna ports.

In an embodiment, the UE only reports the best analog transmit beams to the network. The reported transmit beams should not be from the same group. The reported transmit beams should not include any transmit beams indicated in the received beam restriction configuration. The UE may send uplink sounding signals by applying the receive beams from the selected transmit-receive-beam pair as the transmit beams. The eNodeB receives on these analog beams and derives the CSI information for later downlink data transmission.

In an embodiment, the UE only reports the best analog transmit beams to the network. The reported transmit beams should not be from the same group. The reported transmit beams should not include any transmit beams indicated in the received beam restriction configuration. The eNodeB then transmits a first set of reference signals based on the UE reported best transmit beams. This first set of reference signals is a GRS.

As an example, the eNodeB transmits the first set of reference signals using the same precoding weights (or beam weights) as the reported transmit beams from the UE. To illustrate, the UE reports transmit beams with $\{W_1, W_2, \ldots W_N\}$ where each $W_n$, $1 \le n \le N$, is a vector of precoding weights of the corresponding transmit beam. The eNodeB transmits the first set of reference signals on M ($M \le N$) antenna ports using a subset of precoding vectors from $\{W_1, W_2, \ldots, W_N\}$. The eNodeB configures the UE to receive the first set of reference signals and the UE receives by using the receive beams from the selected transmit-receive-beam pair.

As another example, the eNodeB transmits the first set of reference signals using the precoding weights (or beam weights) based on the reported transmit beams from a group of UEs. To illustrate, UE j of the group of UEs reports transmit beams with $\{W_1, W_2, \ldots W_N\}^{(j)}$ where each $W_n$, $1 \le n \le N$, is a vector of precoding weights of the corresponding transmit beam. The eNodeB transmits the first set of reference signals on M ($M \le N$) antenna ports using a set of precoding vectors based on the $\{W_1, W_2, \ldots, W_N\}^{(j)}$ from the group of UEs. The eNodeB configures the UE of the group of UEs to receive the first set of reference signals and the UE receives by using the receive beams from the selected transmit-receive-beam pair.

In an embodiment, the UE reports multiple sets of best analog transmit beams to the network. The reported transmit beams of each set should not be from the same group. The reported transmit beams should not include any transmit beams indicated in the received beam restriction configuration. The eNodeB then transmits a first set of reference signals based on the UE reported first set of best transmit beams. The eNodeB configures the UE to receive the first set of reference signals and the UE receives by using the receive beams corresponding to the first set of best transmit beams. The eNodeB transmits another set of reference signals based on the UE reported second set of best transmit beams. The eNodeB configures the UE to receive the second set of reference signals and the UE receives by using the receive beams corresponding to the second set of best transmit beams. This second set of reference signals is another GRS.

In an embodiment, the UE derives the CSI feedback based on the first set of reference signals and selects the best set(s) to feedback to the network. The feedback set should include the indexes of the analog transmit beams forming the selected effective MIMO channel and its corresponding rank, CQI, PMI or the pre-coding matrix. More than one set of feedback may be reported to the network, covering different rank or different effective MIMO choices of the same rank, according to network feedback configurations.

In an embodiment, the eNodeB transmits downlink data or control transmission to the UE on the same antenna ports as the first set of reference signals. The eNodeB informs the UE to receive the downlink data or control transmission by using the receive beams from the selected transmit-receive-beam pair. The eNodeB may inform the UE through explicit signaling on, for example, RRC or a physical layer (layer 1) control channel. The eNodeB may inform the UE implicitly by receiving and applying the UE reports. The UE derives channel estimation based on the first set of reference signals and applies the channel estimation to demodulate the associated downlink data or control transmission.

A first reference signal is represented by one or more of its resource mapping, sequence, cyclic shift, cover code, or any combination thereof, to generate a first signal for a first group of users. Similarly, a second reference signal is represented by one or more of its resource mapping, sequence, cyclic shift, cover code, or any combination thereof, to generate a second signal for a second group of users. The first reference signal is then associated to a first set of channels of a first group of users for transmission and reception. Similarly, the second reference signal is associated to a second set of channels of a second group of users for transmission and reception.

The number of GRSs is configurable. In one embodiment and as described in further detail below with respect to FIG. 3, frequency domain multiplexing (FDM) may be used in connection with multiple GRSs. Alternatively, and as described in further detail below with respect to FIG. 4, code division multiplexing (CDM) may be used in connection with multiple GRSs. Embodiments below are illustrated and described using a control channel. However, a data channel can also be used.

A control region of a downlink sub-frame includes the multiplexing of all PDCCHs bits into a single block of data which is subsequently processed to form complex modulated symbols. These symbols are then divided to form blocks of complex-valued symbols quadruplets. These quadruplets are then interleaved and cyclically shifted prior to PDCCH resource mapping.

A control region is associated with each GRS for downlink control information (DCI) transmission. The control region is configurable in size. In one embodiment, each resource region mimics an LTE PDCCH region, and the PDCCH carries scheduling assignments and other control information in the form of DCI messages.

Figure 3:
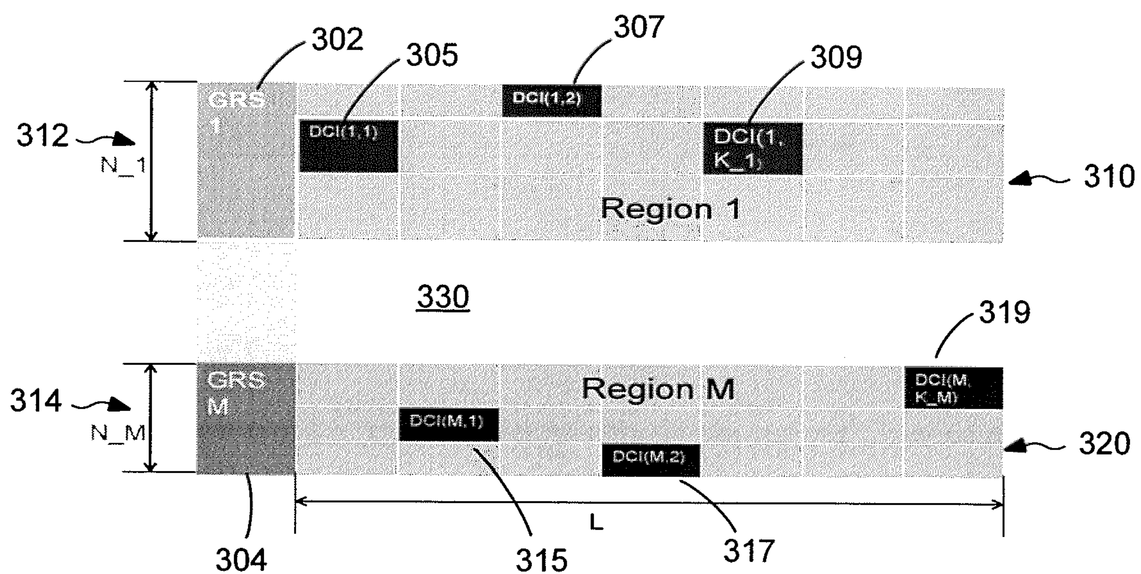
FIG. 3 illustrates the use of frequency domain multiplexing (FDM) in connection with multiple group reference signals (GRSs) for downlink control information (DCI) transmission in accordance with disclosed embodiments.

For example, FIG. 3 illustrates the use of FDM in connection with multiple GRSs for DCI transmission. A first GRS 302 is associated with a first region 310 and a first frequency domain 312, and a second GRS 304 is associated with a second region 320 and a second frequency domain 314, where the respective frequency domains 312, 314 of the first and second GRSs 302, 304 do not overlap. As illustrated, the first GRS 302 and the first region 310 are at the same first frequency location and the second GRS 304 and the second region 320 are at the same second frequency location. It will be appreciated that although the frequency domains 312, 314 of the first and second GRSs 302, 304 are illustrated as not overlapping, they could overlap. In addition, it will be appreciated that although the first and second GRSs 302, 304 are illustrated as being at the same frequency as the first and second regions 310, 320, respectively, they do not have to be so. In addition, as illustrated at 330, the region and the GRS can be blanked. Further, although the first and second GRSs 302, 304 are illustrated as being located at the beginning of their respective control regions 310, 320, the first GRS 302, the second GRS 304, or both the first GRS 302 and the second GRS 304 can be located elsewhere within their respective control regions 310, 320.

The AP determines a PDCCH format to be transmitted to the UE, creates an appropriate DCI, and attaches a cyclic redundancy check (CRC). The PDCCH carries the DCI to indicate the resource assignment in the uplink or the downlink. The CRC is then masked with a user identification or Radio Network Temporary Identifier (RNTI).

The UE is only informed of the number of OFDM symbols within the control region of a sub-frame and is not provided with the location of its corresponding PDCCH. The UE finds its PDCCH by monitoring a set of PDCCH candidates (i.e., the DCI candidates) in every candidate sub-frame. This is referred to as blind decoding. The UE de-masks each control candidate's CRC using its RNTI. If no CRC error is detected, the UE considers it as a successful decoding attempt and reads the control information within the successful candidate.

An AP instructs a UE as to which region to search for DCI candidates. Candidates within the region are associated with the user ID or RNTI of the UE. The candidates for blind decoding can be spread across multiple regions. For example, referring to FIG. 3, the AP may instruct the UE to search for DCI candidates 305, 307, and 309 in the first region 310 and to search for DCI candidates 315, 317, and 319 in the second region 320.

Figure 4:
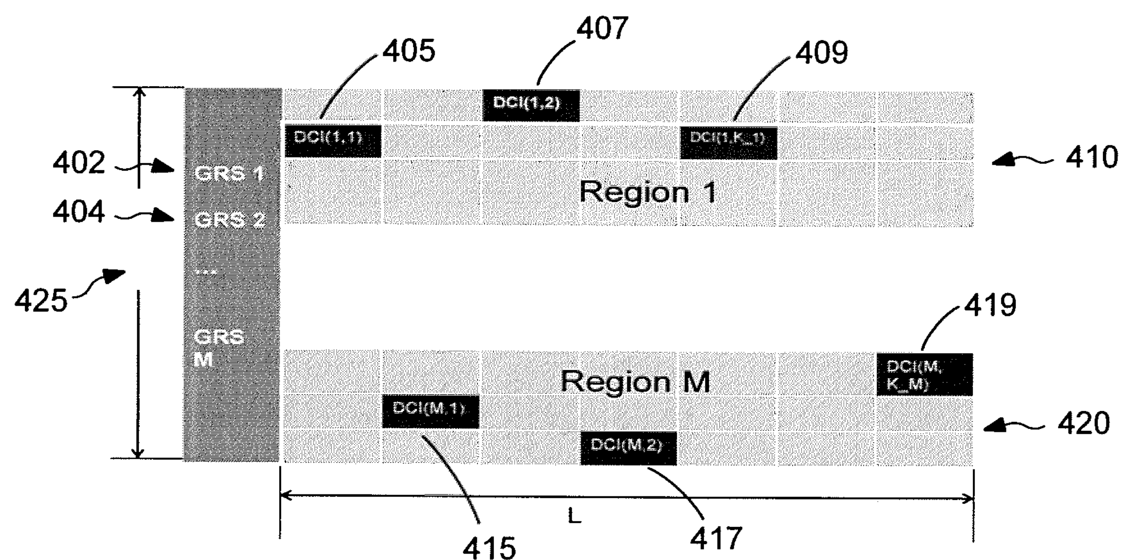
FIG. 4 illustrates the use of code division multiplexing (CDM) in connection with multiple GRSs for DCI transmission in accordance with disclosed embodiments.

FIG. 4 illustrates the use of CDM in connection with multiple GRSs for DCI transmission. A first GRS 402 is associated with a first region 410 and a frequency domain 425, and a second GRS 404 is associated with the first region 410 and the frequency domain 425. As illustrated, the first GRS 402, the second GRS 404, and the first region 410 are at the same first frequency location such that the resources interleave in the frequency domain 425. In other words, the first and second GRSs 402, 404 occupy the same resources and are not separate from the frequency domain 425. Different spreading codes are used for the first GRS 402, the second GRS 404, etc. so that the GRSs do not interfere with each other.

As explained above, the AP instructs a UE as to which region to search for DCI candidates, and the candidates for blind decoding can be spread across multiple regions. For example, referring to FIG. 4, the AP may instruct the UE to search for DCI candidates 405, 407, and 409 in the first region 410 and to search for DCI candidates 415, 417, and 419 in a second region 420.

After the UE receives the DCI, it will try to decode the PDSCH and thereafter will send either an ACK message (data received or decoded correctly) or a NACK message (data not received or decoded correctly). The UE can use the GRS information in the associated region to derive the uplink resource that it is going to use for ACK/NACK information.

Though the above descriptions are mainly for LTE systems, the concepts may be applicable in other OFDMA based systems, WiFi systems, etc.

Figure 5:
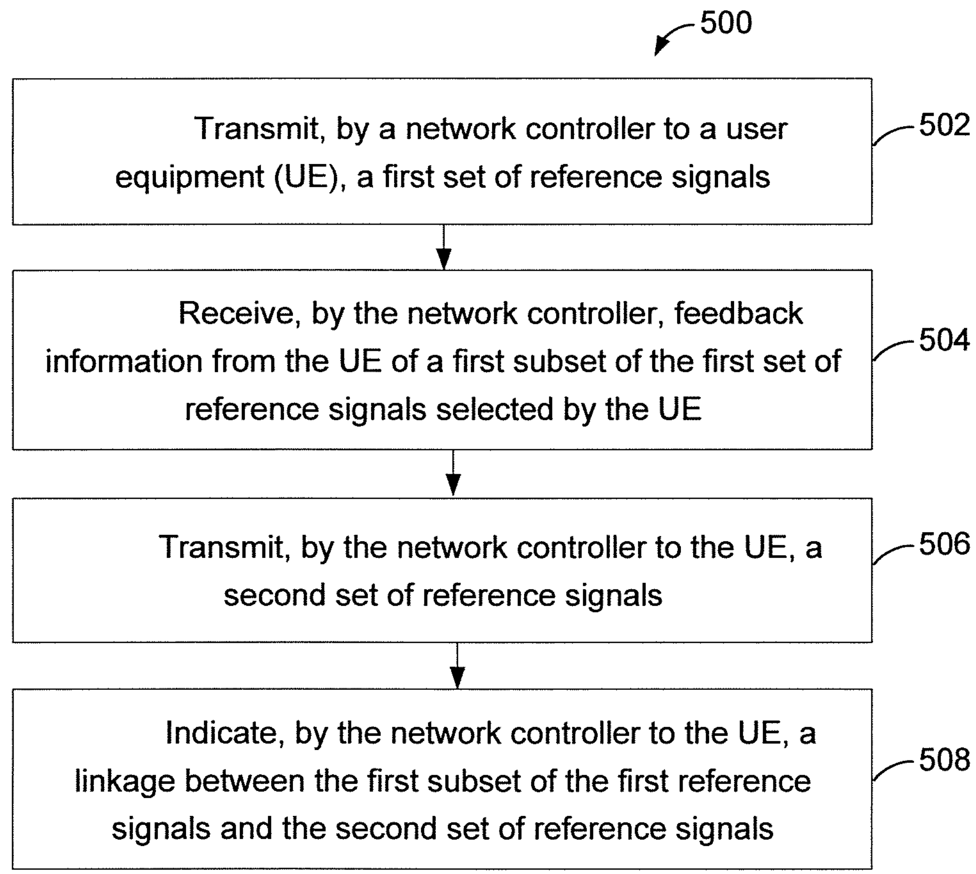
FIG. 5 illustrates an example method for wireless communications in accordance with disclosed embodiments.

FIG. 5 illustrates an example method 500 for wireless communications. In some embodiments, the method 500 could be performed by a base station 770—the base station 770 described in greater detail below with respect to FIG. 7.

The method 500 comprises transmitting, by a network controller to a user equipment (UE), a first set of reference signals, at step 502. For example, the base station 770 of FIG. 7 transmits the first set of reference signals to a UE 710. For example in a particular embodiment, the base station 770 sends a sequence of reference signals, each reference signal using different analog beamforming.

The method comprises receiving, by the network controller, feedback information from the UE of a first subset of the first set of reference signals selected by the UE, at step 504. For example in a particular embodiment, the UE 710 receives the first set of reference signals, determines which reference signals are the best ones, and sends a report back to the base station 770.

The method 500 comprises transmitting, by the network controller to the UE, a second set of reference signals, at step 506, and indicating, by the network controller to the UE, a linkage between the first subset of the first set of reference signals and the second set of reference signals, at step 508. For example in a particular embodiment, the base station 770 uses the information about the best beams reported by the UE 710 to send the actual reference signals to the UE 710, and the UE 710 uses the best receive beams to receive those reference signals. For example, in a particular embodiment the UE 710 may use the best beams to form a virtual MIMO channel to feed back the MIMO information (e.g., precoding, rank of transmission, and access level) to the base station 770 and then the base station 770 uses that to transmit data to the UE 710. In another embodiment, the base station 770 may form a set of reference signals based on the information received from the UE 710, the UE 710 uses the corresponding receive beam, and then the UE 710 determines the precoding, rank of transmission, and access level information, and feeds back again to the base station 770.

Figure 6:
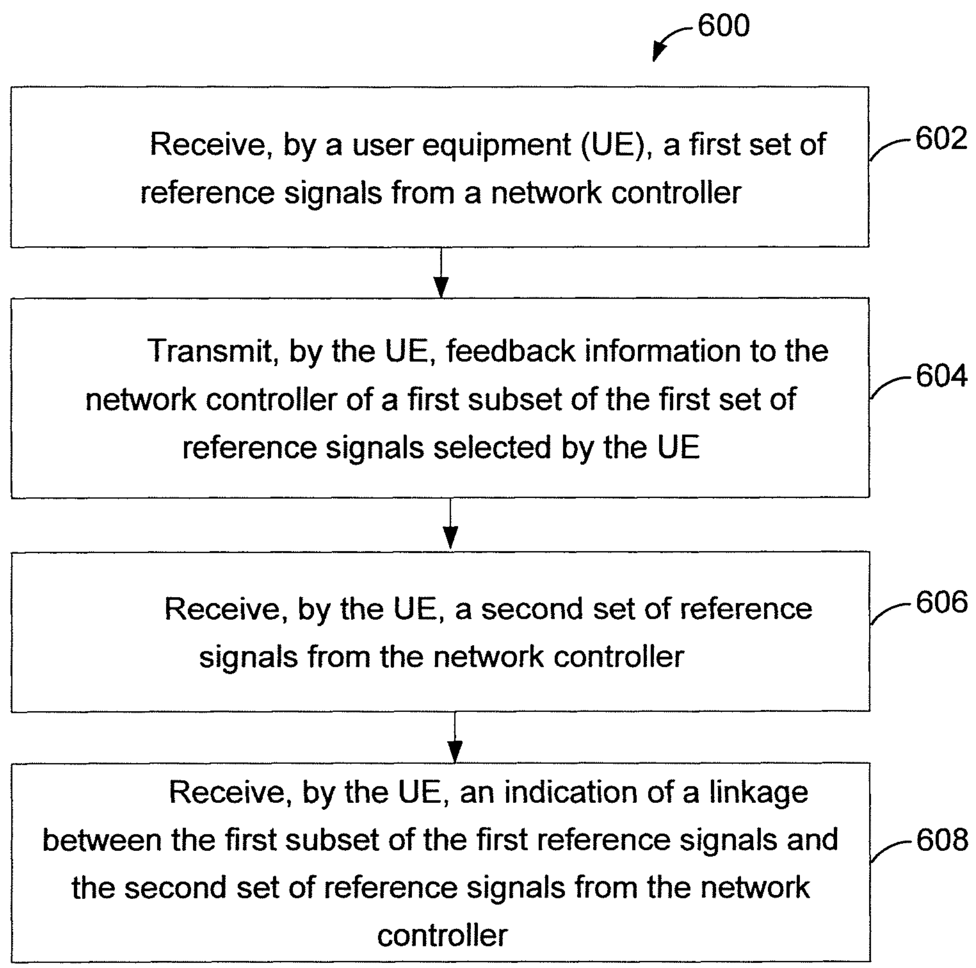
FIG. 6 illustrates an example method for communicating in a wireless network in accordance with disclosed embodiments.

FIG. 6 illustrates an example method 600 for communicating in a wireless network. In some embodiments, the method 600 could be performed by the UE 710.

The method 600 comprises receiving, by a UE, a first set of reference signals from a network controller, at step 602. For example, the UE 710 receives the first set of reference signals from the base station 770. In a particular embodiment, the base station 770 sends a sequence of reference signals, each reference signal using different analog beamforming.

The method 600 comprises transmitting, by the UE, feedback information to the network controller of a first subset of the first set of reference signals selected by the UE, at step 604. For example, in a particular embodiment, the UE 710 receives the first set of reference signals, determines which reference signals are the best ones, and sends a report back to the base station 770.

The method 600 comprises receiving, by the UE, a second set of reference signals from the network controller at step 606, and receiving, by the UE, an indication of a linkage between the first subset of the first set of reference signals and the second set of reference signals from the network controller at step 608. For example in a particular embodiment, the base station 770 uses the information about the best beams reported by the UE 710 to send the actual reference signals to the UE 710, and the UE 710 uses the best receive beams to receive those reference signals. For example, in a particular embodiment, the UE 710 may use the best beams to form a virtual MIMO channel to feed back the MIMO information (e.g., precoding, rank of transmission, and access level) to the base station 770, and then the base station 770 uses that to transmit data to be received by the UE 710. In another embodiment, the base station 770 may form a set of reference signals based on the information received from the UE 710, the UE 710 uses the corresponding receive beam, and then the UE 710 determines the precoding, rank of transmission, and access level information, and feeds back again to the base station 770.

Figure 7:
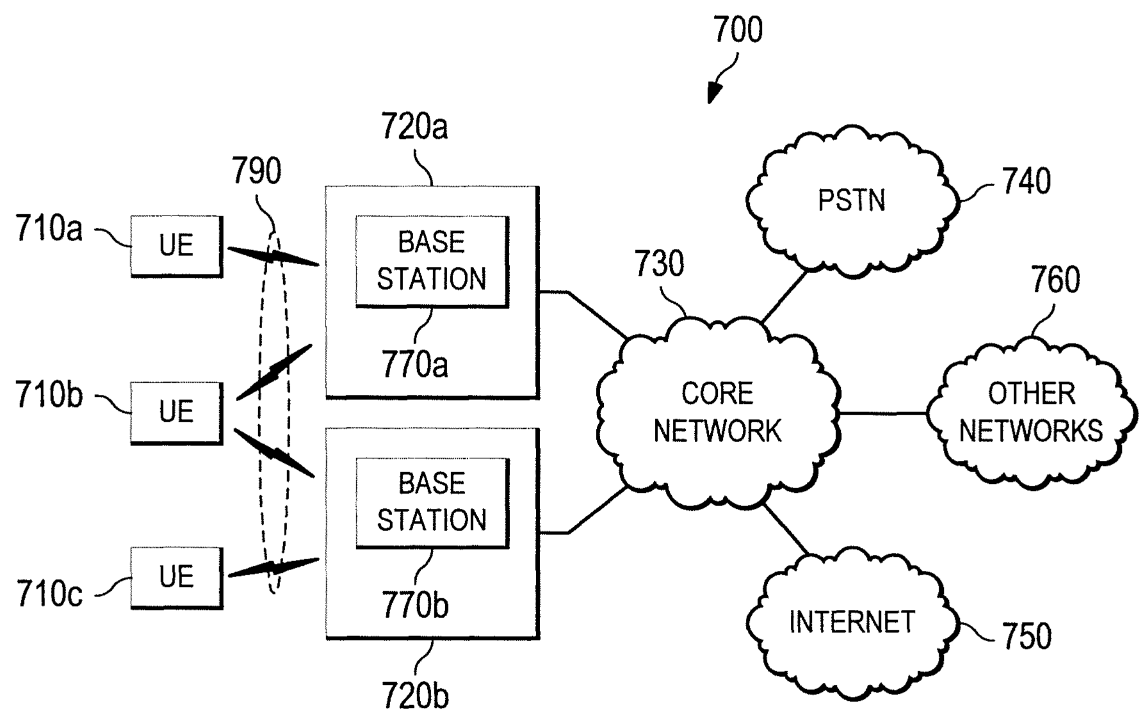
FIG. 7 illustrates a diagram of an illustrative communication system that can implement transmission and reception of control and data channels with a group reference signal in accordance with disclosed embodiments.

FIG. 7 illustrates an example communication system 700 that can implement transmission and reception of control and data channels with a group reference signal according to this disclosure. In general, the system 700 enables multiple wireless users to transmit and receive data and other content. The system 700 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 700 includes user equipment (UE) 710*a*-710*c*, radio access networks (RANs) 720*a*-720*b*, a core network 730, a public switched telephone network (PSTN) 740, the Internet 750, and other networks 760. While certain numbers of these components or elements are shown in FIG. 7, any number of these components or elements may be included in the system 700.

The UEs 710*a*-710*c* are configured to operate and/or communicate in the system 700. For example, the UEs 710*a*-710*c* are configured to transmit and/or receive wireless signals. Each UE 710*a*-710*c* represents any suitable end user device and may include such devices (or may be referred to)

as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 720*a*-720*b* here include base stations 770*a*-770*b*, respectively. Each base station 770*a*-770*b* is configured to wirelessly interface with one or more of the UEs 710*a*-710*c* to enable access to the core network 730, the PSTN 740, the Internet 750, and/or the other networks 760. For example, the base stations 770*a*-770*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 7, the base station 770*a* forms part of the RAN 720*a*, which may include other base stations, elements, and/or devices. Also, the base station 770*b* forms part of the RAN 720*b*, which may include other base stations, elements, and/or devices. Each base station 770*a*-770*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 770*a*-770*b* communicate with one or more of the UEs 710*a*-710*c* over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 720*a*-720*b* are in communication with the core network 730 to provide the UEs 710*a*-710*c* with voice, data, application, Voice over Internet Protocol (VoIP), or other services. Understandably, the RANs 720*a*-720*b* and/or the core network 730 may be in direct or indirect communication with one or more other RANs (not shown). The core network 730 may also serve as a gateway access for other networks (such as PSTN 740, Internet 750, and other networks 760). In addition, some or all of the UEs 710*a*-710*c* may include functionality for communicating with different wireless networks over different wireless links using different wireless technologies and/or protocols.

Although FIG. 7 illustrates one example of a communication system 700 that can implement transmission and reception of control and data channels with a group reference signal, various changes may be made to FIG. 7. For example, the communication system 700 could include any number of UEs, base stations, networks, or other components in any suitable configuration.

Figure 8A:
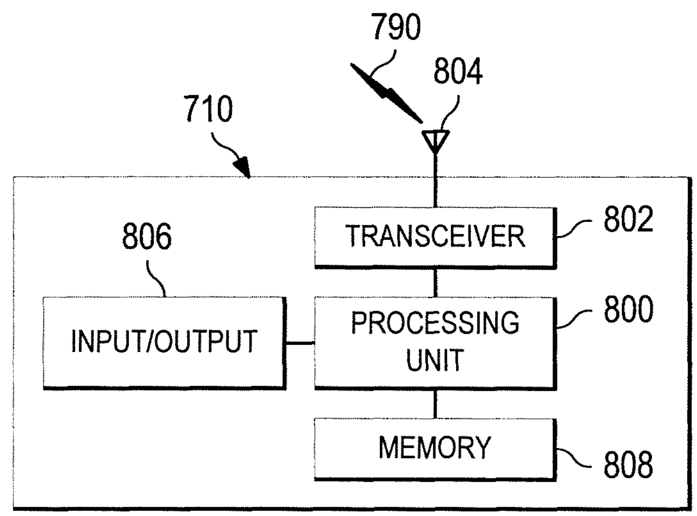
FIGS. 8A and 8B illustrate example devices that can implement transmission and reception of control and data channels with group reference signal in accordance with disclosed embodiments.
Figure 8B:
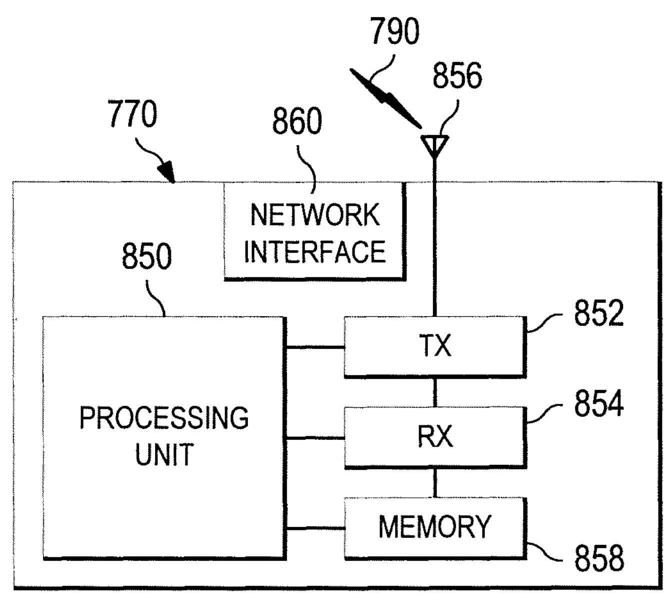

FIGS. 8A and 8B illustrate example devices that can implement transmission and reception of control and data channels with a group reference signal according to this disclosure. In particular, FIG. 8A illustrates an example UE 710, and FIG. 8B illustrates an example base station 770. These components could be used in the system 700 or in any other suitable system.

As shown in FIG. 8A, the UE 710 includes at least one processing unit 800. The processing unit 800 implements various processing operations of the UE 710. For example, the processing unit 800 could perform signal coding, data processing, power control, input/output processing, or any other functionality enabling the UE 710 to operate in the system 700. The processing unit 800 also supports the receipt and use of control and data channels with a group reference signal as described in more detail below. Each processing unit 800 includes any suitable processing or computing device configured to perform one or more operations. Each processing unit 800 could, for example, include a microprocessor, microcontroller, digital signal processor, field programmable gate array, or application specific integrated circuit.

The UE 710 also includes at least one transceiver 802. The transceiver 802 is configured to modulate data or other content for transmission by at least one antenna 804. The transceiver 802 is also configured to demodulate data or other content received by the at least one antenna 804. Each transceiver 802 includes any suitable structure for generating signals for wireless transmission and/or processing signals received wirelessly. Each antenna 804 includes any suitable structure for transmitting and/or receiving wireless signals. One or multiple transceivers 802 could be used in the UE 710, and one or multiple antennas 804 could be used in the UE 710. Although shown as a single functional unit, a transceiver 802 could also be implemented using at least one transmitter and at least one separate receiver.

The UE 710 further includes one or more input/output devices 806. The input/output devices 806 facilitate interaction with a user. Each input/output device 806 includes any suitable structure for providing information to or receiving information from a user, such as a speaker, microphone, keypad, keyboard, display, or touch screen.

In addition, the UE 710 includes at least one memory 808. The memory 808 stores instructions and data used, generated, or collected by the UE 710. For example, the memory 808 could store software or firmware instructions executed by the processing unit(s) 800 and data used to reduce or eliminate interference in incoming signals. Each memory 808 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 770 includes at least one processing unit 850, at least one transmitter 852, at least one receiver 854, one or more antennas 856, at least one memory 858, and a network interface 860. The processing unit 850 implements various processing operations of the base station 770, such as signal coding, data processing, power control, input/output processing, or any other functionality. The processing unit 850 can also support the generation of signaling as described in more detail below. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transmitter 852 includes any suitable structure for generating signals for wireless transmission to one or more UEs or other devices. Each receiver 854 includes any suitable structure for processing signals received wirelessly from one or more UEs or other devices. Although shown as separate components, at least one transmitter 852 and at least one receiver 854 could be combined into a transceiver. Each antenna 856 includes any suitable structure for transmitting and/or receiving wireless signals. While a common antenna 856 is shown here as being coupled to both the transmitter 852 and the receiver 854, one or more antennas 856 could be coupled to the transmitter(s) 852, and one or more separate antennas 856 could be coupled to the receiver(s) 854. Each memory 858 includes any suitable volatile and/or non-volatile storage and retrieval device(s).

Additional details regarding the UEs 710 and the base stations 770 are known to those of skill in the art. As such, these details are omitted here for clarity.

Although FIGS. 8A and 8B illustrate examples of such devices, various changes may be made to FIGS. 8A and 8B. For example, each device 800, 850 could include any other or additional components according to particular needs.

Although features and elements are described above in particular combinations, each feature or element can be used alone without the other features and elements or in various combinations with or without other features and elements. Some or all of the functions or processes of the one or more of the devices or methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for wireless communications, the method comprising:

transmitting, by a network controller to a user equipment (UE), a first set of reference signals;

receiving, by the network controller, feedback information from the UE of a first subset of the first set of reference signals selected by the UE;

transmitting, by the network controller to the UE, a second set of reference signals; and indicating, by the network controller to the UE, a linkage of same receive beams at the UE being used for each reference signal in the second set of reference signals and one reference signal of the first subset of the first set of reference signals.

2. The method according to claim 1, wherein the receive beams at the UE comprise receive analog beams.

3. The method according to claim 1, wherein the linkage is indicated to the UE through an upper layer configuration signaling, a physical layer downlink control information, or a combination of both.

4. The method according to claim 1, wherein each reference signal of the first set of reference signals is transmitted using different beamforming.

5. The method according to claim 1, wherein the feedback information from the UE comprises multiple-input multiple output (MIMO) information, the MIMO information comprising one or more of precoding information, rank indication of transmission, channel state information, and access level information, based on measurements of the first subset of the first set of reference signals.

6. The method according to claim 1, wherein the second set of reference signals comprises a first reference signal and a second reference signal.

7. The method according to claim 1, the method further comprising:

receiving, by the network controller, another feedback information from the UE of a second subset of the first set of reference signals selected by the UE; and selecting, by the network controller, a third subset of the first set of reference signals from the first subset of the first set of reference signals and the second subset of the first set of reference signals.

8. The method according to claim 1, each reference signal in the second set of reference signals being one of a demodulation reference signal (DMRS) for a physical downlink control channel (PDCCH), a DMRS for a physical downlink shared channel (PDSCH), or a channel state information-reference signal (CSI-RS).

9. The method according to claim 1, each reference signal in the first set of reference signals being a CSI-RS.

10. The method according to claim 1, the second set of reference signals being a DMRS for PDCCH in a control resource region.

11. A network controller in a wireless network for communicating with a user equipment (UE), the network controller comprising:

a non-transitory memory storage comprising instructions; and one or more processors in communication with the non-transitory memory storage, wherein the one or more processors execute the instructions to:

transmit a first set of reference signals to the UE and a second set of reference signals to the UE;

receive feedback information from the UE of a first subset of the first set of reference signals selected by the UE; and indicate, to the UE, a linkage of same receive beams at the UE being used for each reference signal in the second set of reference signals and one reference signal of the first subset of the first set of reference signals.

12. The network controller according to claim 11, wherein each reference signal of the first set of reference signals is transmitted using different beamforming.

13. The network controller according to claim 11, wherein the one or more processors execute the instructions to:

receive another feedback information from the UE of a second subset of the first set of reference signals selected by the UE; and select a third subset of the first set of reference signals from the first subset of the first set of reference signals and the second subset of the first set of reference signals.

14. The network controller according to claim 11, wherein each reference signal in the second set of reference signals is one of a demodulation reference signal (DMRS) for a physical downlink control channel (PDCCH), a DMRS for a physical downlink shared channel (PDSCH), or a channel state information-reference signal (CSI-RS).

15. The network controller according to claim 11, wherein each reference signal in the first set of reference signals is a CSI-RS.

16. The network controller according to claim 11, wherein the second set of reference signals is a DMRS for PDCCH in a control resource region.

17. A method in a user equipment (UE) for communicating in a wireless network, the method comprising:

receiving, by the UE, a first set of reference signals from a network controller;

transmitting, by the UE, feedback information to the network controller of a first subset of the first set of reference signals selected by the UE;

receiving, by the UE, a second set of reference signals from the network controller; and receiving, by the UE, an indication of a linkage of same receive beams at the UE being used for each reference signal in the second set of reference signals and one reference signal of the first subset of the first set of reference signals.

18. The method according to claim 17, the method further comprising:

transmitting, by the UE, another feedback information to the network controller of a second subset of the first set of reference signals selected by the UE.

19. The method according to claim 17, each reference signal in the first set of reference signals being a CSI-RS.

20. The method according to claim 17, the linkage being provided in a DCI.

21. The method according to claim 17, the linkage being provided in a radio resource control (RRC) signaling.

22. A user equipment (UE) for communicating in a wireless network, the UE comprising:

a non-transitory memory storage comprising instructions; and one or more processors in communication with the non-transitory memory storage, wherein the one or more processors execute the instructions to:

receive a first set of reference signals from a network controller;

transmit feedback information to the network controller of a first subset of the first set of reference signals selected by the UE;

receive a second set of reference signals from the network controller; and receive an indication of a linkage of same receive beams at the UE being used for each reference signal in the second set of reference signals and one reference signal of the first subset of the first set of reference signals.

23. The UE according to claim 22, wherein the one or more processors execute the instructions to:

transmit another feedback information to the network controller of a second subset of the first set of reference signals selected by the UE.

24. The UE according to claim 22, wherein each reference signal in the second set of reference signals is one of a demodulation reference signal (DMRS) for a physical downlink control channel (PDCCH), a DMRS for a physical downlink shared channel (PDSCH), or a channel state information-reference signal (CSI-RS).

25. The UE according to claim 22, wherein each reference signal in the first set of reference signals is a CSI-RS.

* * * * *